Figure 1:
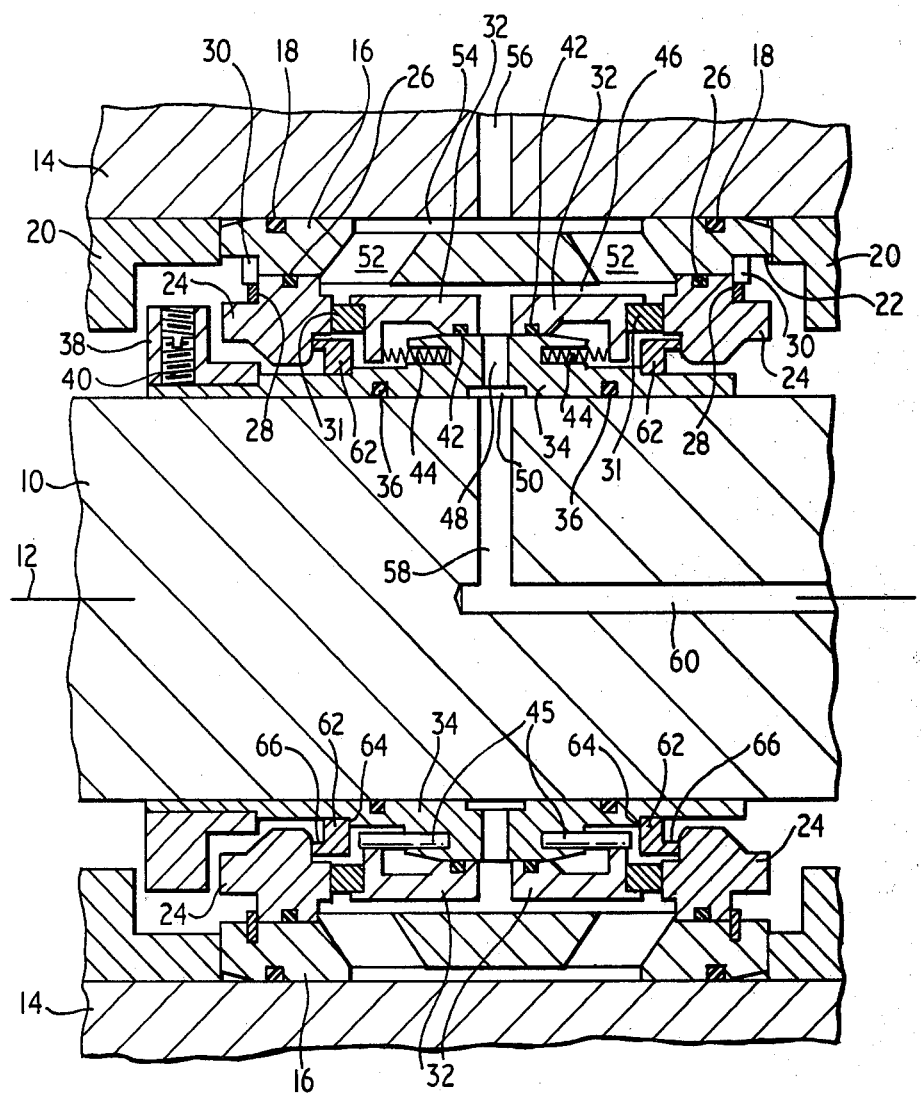

United States Patent [19]

Cannings

[11] 4,294,454
[45] Oct. 13, 1981

[54] ROTARY SEAL UNIT

[76] Inventor: John A. Cannings, Midway, Crowe Hill, Limpley Stoke, Bath, Avon, England

[21] Appl. No.: 117,836

[22] Filed: Jan. 30, 1980

[30] Foreign Application Priority Data

Feb. 5, 1979 [GB] United Kingdom .............. 03907/79

[51] Int. Cl.³ .............................................. F16J 15/34
[52] U.S. Cl. .................................. 277/65; 277/81 R; 277/DIG. 8
[58] Field of Search .................... 277/65, 81 R, 96 R, 277/96.2, DIG. 8

[56] References Cited

U.S. PATENT DOCUMENTS

| 2,820,653 | 1/1958 | Yokel .................................... 277/65 |
| 2,859,054 | 9/1958 | Willi . |
| 2,931,631 | 4/1960 | Harrison ............................... 277/65 |
| 3,122,373 | 2/1964 | Lee et al. . |
| 3,313,580 | 11/1967 | Jelatis et al. . |
| 3,582,089 | 6/1971 | Amorese . |

FOREIGN PATENT DOCUMENTS

| 1770443 | 7/1958 | Fed. Rep. of Germany . |
| 2094529 | 1/1972 | France . |
| 768820 | 2/1957 | United Kingdom . |
| 813328 | 5/1959 | United Kingdom . |
| 855448 | 11/1960 | United Kingdom . |
| 1045339 | 10/1966 | United Kingdom . |
| 1148554 | 4/1969 | United Kingdom . |
| 1195132 | 6/1970 | United Kingdom . |
| 1470969 | 4/1977 | United Kingdom . |

Primary Examiner—Robert I. Smith
Attorney, Agent, or Firm—Cushman, Darby & Cushman

[57] ABSTRACT

A rotary seal unit is fitted between a shaft and a surrounding member. The unit comprises a runner fixed to the shaft and within an outer housing fixed to the surround member. Mating sealing rings are carried one by the housing and the other by the runner. One of the rings is axially fixed while the other is axially slidable and urged by springs towards said one ring. The housing encloses and protects the sealing rings prior to and during fitting. A soft (or hard) setting ring may be provided to axially locate the axially fixed ring and the component carrying the other ring, but permitting rotation between them, so that the spring loading of the rings is not disturbed during fitting. The softer material wears away in use. The setting ring also protects against entry of dirt. An annular bearing can provide a similar result. The seals within the unit can be provided in axially spaced pairs, defining a space between them.

4 Claims, 3 Drawing Figures

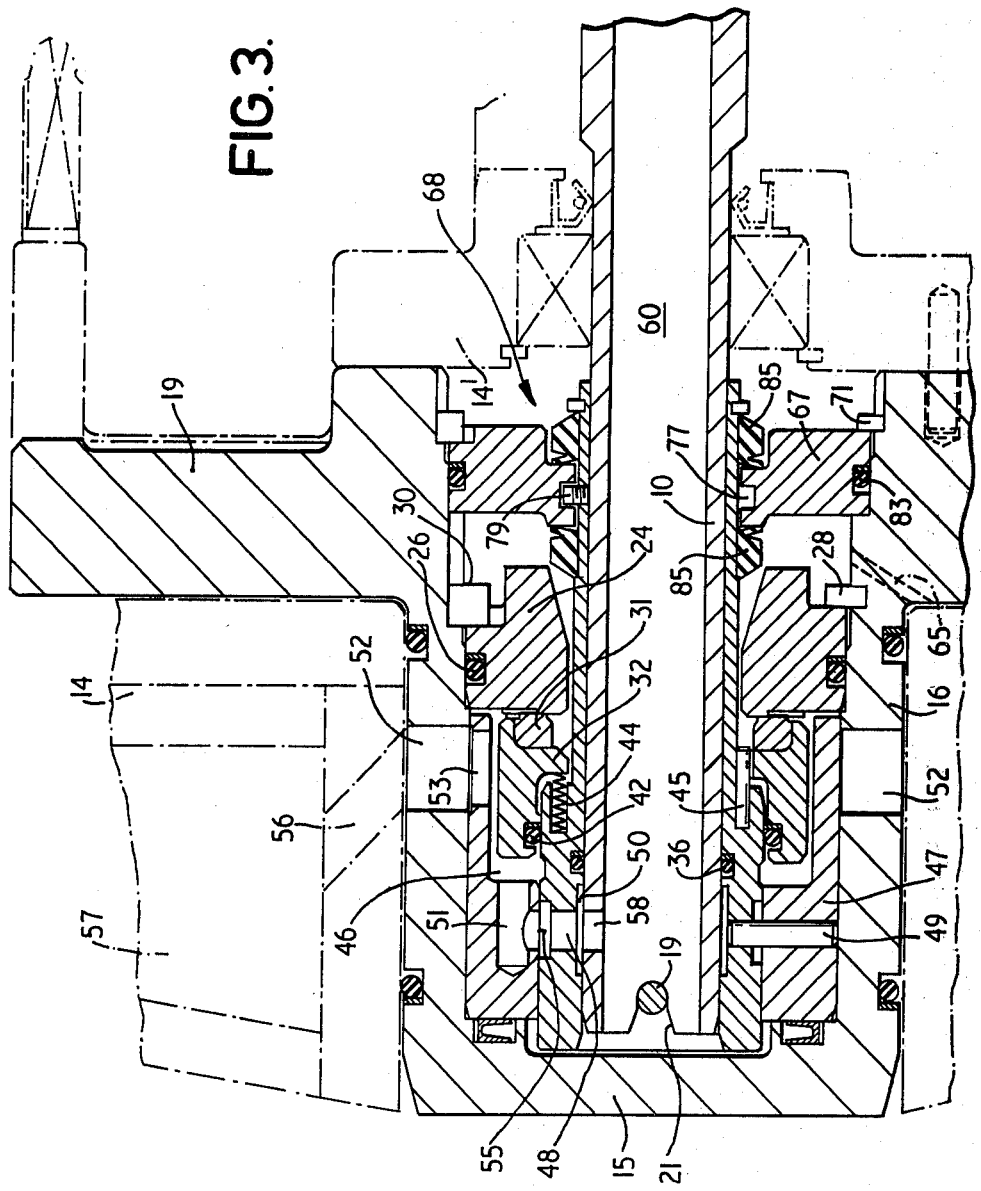

ROTARY SEAL UNIT

This invention relates to a seal for fitting around a shaft and in association with a member with which the shaft is relatively rotatable. It is especially applicable to permitting the transfer of fluid to or from a passage in the shaft.

Mechanical seals are used to prevent leakage between separate spaces through which a rotary shaft passes. Frequently, fluid in one space is at a higher pressure than in an adjacent space, so that the seal has to withstand this pressure difference. These seals generally rely on the intimate contact between two annular sealing faces which meet at a sealing plane at right-angles to the shaft axis. The force keeping the faces together is provided by fluid pressure, or spring forces or both. Where springs are used, they have to be correctly set. In some cases, two or more seals are provided along the shaft, so as to define a space between adjacent seals which can be filled with a different fluid from that in the adjacent spaces. Usually this is done so that fluid can be transmitted from a passage in the stationary surround member and a passage in the rotary shaft. This may be used, for example, in supplying water along the shaft to a cutting head of a road-header machine used in coal mines, or in supplying pneumatic or hydraulic fluid to a shaft for operating a control mechanism at a remote position along the shaft. Another application of a rotary seal is in simply supplying fluid to a passage in a rotary shaft from a stationary source without leakage of the fluid.

The main problems with installing rotary seals on equipment is to ensure that the seal is correctly set when installed, and to avoid damage to the seal, in particular the sealing faces, during storage, transport, handling and installation of the seal.

The present invention provides a seal unit for fitting to a shaft, the unit comprising an annular housing component which is to be rotatable relative to the shaft, an annular runner component for securing around the shaft within the housing component, a first sealing member within the housing component and carried thereby, a second sealing member within the housing and carried by the runner, one of said sealing members being axially located on the housing or runner component which carries it, and the other of said sealing members being axially slidable on the runner or housing component which carries it, with spring means acting between said other sealing member and its respective housing or runner component to urge the sealing member into sealing engagement with said one sealing member, thereby establishing an annular seal separating spaces on either side. Preferably, the housing or runner, or each of them, has a passage therethrough communicating with a said space.

It is preferred to provide for said one sealing member a setting ring which acts between that sealing member and the component which carries the other sealing member to locate said one sealing member against axial movement towards the mating sealing member, the setting ring being rotatable relative to either or both of the parts which it engages and of a material of relatively different hardness, so that after the seal has been running for some time the softer material wears away to provide a clearance between the setting ring and one or both of said parts. In another arrangement, the housing component and the runner component are located against relative axial displacement by a rotary bearing which acts between them and permits relative rotation of the two components.

In many instances, axially spaced apart pairs of sealing members will be provided, defining a space between them.

Figure 2:
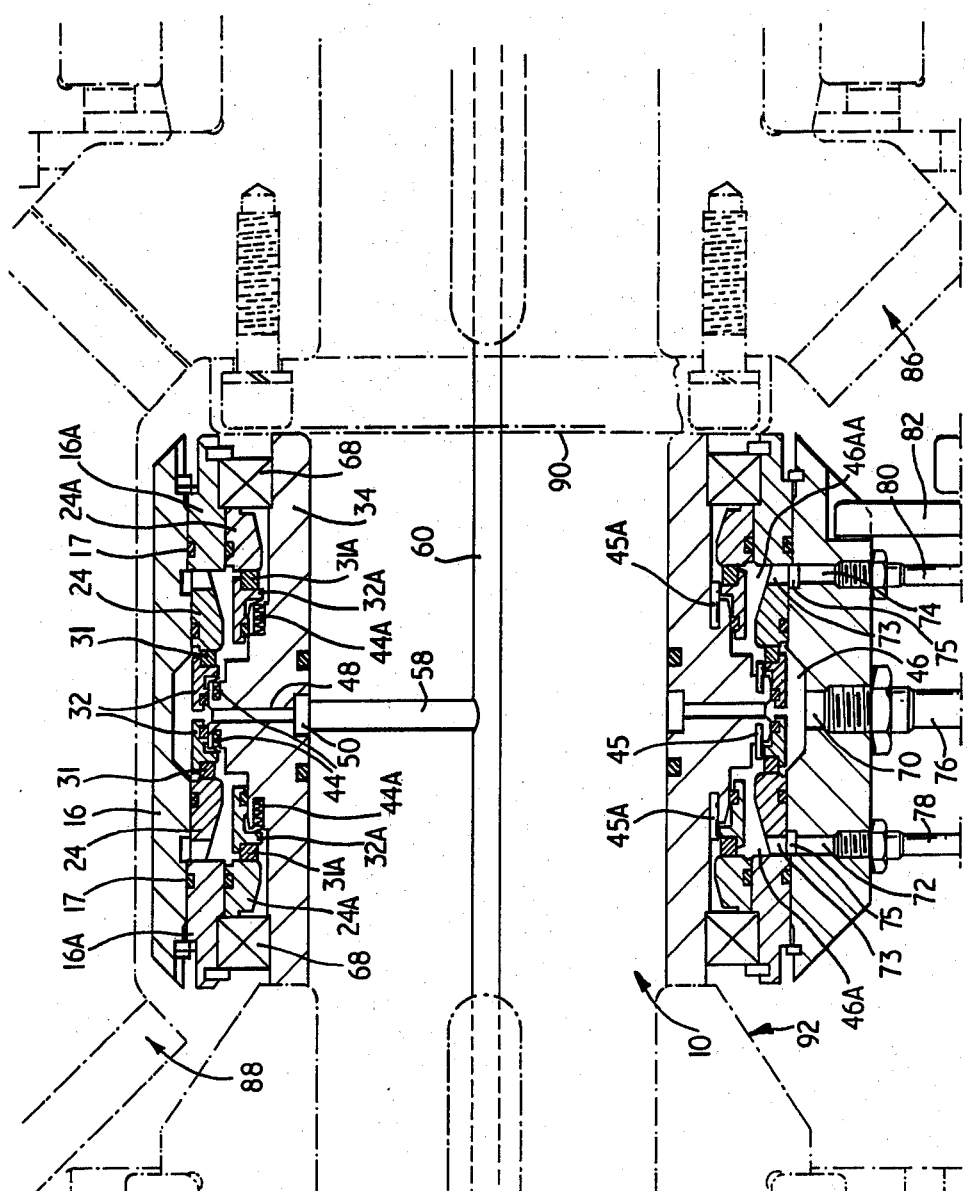

In order that the invention may be more clearly understood, three embodiments will now be described with reference to the accompanying drawings, wherein:

FIG. 1 shows a diametrical cross-sectional view through a first embodiment of annular seal in use, FIG. 2 shows a similar view of a second embodiment of annular seal in use; and FIG. 3 shows a similar view of a third embodiment of annular seal in use.

Referring to FIG. 1; the seal is located in an annular gap between a shaft 10 which rotates about its axis 12 and a relatively stationary surround member 14. The seal comprises an annular housing component 16 which fits closely against the stationary member 14 and is sealed thereto by O-rings 18. It is located axially by end abutment members 20, which are associated with the stationary member 14 (and are not part of the seal assembly itself). A key 22 is provided between the housing 16 and one of the locating members 20 so as to prevent rotation of the housing 16 relative to the stationary member 14. A pair of annular sealing ring supports 24 are a close fit within end portions of the housing 16, and are sealed thereto by O-rings 26. They engage inner shoulders in the housing 16 and are located against axial movement outwardly of the housing 16 by means of circlips 28, each of which has a radial flange 30 at one point which provides a key preventing relative rotation between its respective sealing ring support and the housing. Each sealing ring support 24 carries an annular sealing ring 31 which provides a flat sealing face in a plane at right angles to the axis 12. The sealing rings 31 mate with a second pair of annular sealing rings 32 which are carried on a runner 34 which is in the form of a sleeve which closely fits around the shaft 10, is sealed thereto by O-rings 36, and is secured against axial displacement and against rotation relative to the shaft by means of a locking ring 38 having one or more clamping screws 40. The sealing rings 32 are sealed to the runner by means of O-rings 42. Axial keys 45 locate the sealing rings 32 against rotation relative to the runner, while allowing free relative axial movement between them. A series of compression springs 44 are distributed around the axis 12 and act between the runner and the two sealing rings 32 so as to urge the sealing rings mutually outwardly into contact with their cooperating sealing rings 31.

It will be seen that a fluid-containing space 46 is thereby established between the two seals provided by the sealing members 31,32. (The fluid is of course initially air, but may in use be other gases or liquids.) The space 46 opens radially inwardly to a series of radial passages 48 in the runner. These passages communicate with an annular recess 50 on the inside face of the runner. The space 46 communicates radially outwardly through inclined passages 52 in the housing 16, which communicate with an annular recess 54 in the outside face of the housing. In the arrangement shown, the annular recess 54 communicates with a fluid transfer passage 56 in the stationary member 14, and the annular recess 50 communicates with a radial fluid transfer passage 58 in the shaft 10, which in turn communicates with an axial fluid transfer passage 60 in the shaft. It will be seen, therefore, that the seal allows continuous fluid transfer between the fixed passage 56 and the rotating passage 58.

A particular feature of the seal is that all the principal sealing components are enclosed within the housing 16, and are thus protected thereby. There is thus small risk of damage to these precision-made, delicate components during storage, handling and fitting of the seal. It will also be seen, however, that if the seal has only the construction just described, the runner 34 will be axially displaceable relative to the housing 16. The springs 44 will normally keep the runner in a central equilibrium position, but in the course of fitting the seal, the runner can easily become axially displaced from this position, with the result that the pressure in the springs 44 on one side is different from that in the springs on the other side, resulting in an excessive loading of one bearing, and perhaps insufficient loading on the other bearing. To counteract this, two setting rings 62 are provided around the runner. They are axially located mutually inwardly by seating against shoulders 64 on the runner. The setting rings are of generally L cross-section, providing mutually outwardly directed annular ribs 66 which initially slidably engage the sealing ring supports 24, as shown. The setting rings thus locate the runner centrally with respect to the sleeve 16 during the installation of the seal, and allow rotation of the runner relative to the housing 16 during use. However, the setting rings are made of relatively soft material, and quickly wear, either against the runner or against the sealing ring supports 24, or both, thereby establishing a clearance so that the setting rings offer virtually no resistance to the operation of the seal. Another use of the setting rings is in closing the annular gap between the runner and the sealing ring supports 24, before the seal is installed, thereby minimizing the danger of dirt or other undesirable matter getting into this space and coming into contact with the sealing surfaces.

The foregoing embodiment is intended merely as one example of the way in which the present invention can be carried out. The housing 16 can be located and secured to the stationary member 14 in a variety of ways, depending upon the shape of the stationary member, and similarly the runner can be secured to the shaft in a variety of different ways, depending upon the shape of the shaft. The passages 52 in the housing can be arranged in the optimum position for directing the flow of fluid around the bearing surfaces to keep cool and clean. This is the reason why passages 52 in this embodiment are divergent towards the sealing ring supports 24.

FIG. 2 shows a seal which is similar in many respects to that of FIG. 1, and like parts are given the same reference numerals, and will not be further described in detail. In this embodiment, however, two further annular seals are established on either side of the central pair of annular seals. These further seals are established by sealing ring supports 24A, carrying sealing rings 31A, which co-operate with sealing rings 32A which are also carried on the runner 34 and are acted upon by springs 44A. The annular sealing ring supports 24A are mounted within annular parts 16A which are carried within the ends of the housing 16 and form a part of the housing, being sealed thereto by O-rings 17. Conventional rotary bearings 68 are located between the housing parts 16A and the runner 34 so as to locate them against relative axial movement, while allowing them free relative rotational movement.

It will be seen that this seal not only provides a central space 46 between the first pair of seals, but provides two additional and separate spaces 46A, 46AA between the inner pair of seals and the outer pair of seals. In this embodiment, the central space 46 communicates with a passage 58 in the shaft 10 via passages 48 and annular recess 50 in the runner 34. A passage 70 through the housing 16 also communicates with the space 46. The other two spaces 46A, 46AA are not in communication with the shaft, but are in communication with passages 72,74 respectively passing through the housing 16; these passages communicating at their inner ends with annular rebates 75 on the inside surface of the housing and passages 73 formed in the bearing supports 24. A fluid supply conduit 76 is connected to the passage 70, and fluid drain conduits 78,80 are connected to the passages 72,74 respectively. Thus, fluid under pressure from the conduit 76 is supplied via the space 46 to the passages 58,60 in the shaft 10, while any of that fluid which may leak past the inner seals provided by the sealing members 31,32 passes into the outer space 46A or 46AA and is drained through conduit 78 or 80. The three conduits are of course stationary, and the housing 16 is restrained against rotation by means of a keying bracket 82 which engages the housing and is mounted to a fixed member of the machinery of which the shaft 10 forms a part. In this particular embodiment, the shaft is part of a gear box assembly, and carries a bevelled pinion 86 which meshes with another pinion 88 at right angles thereto. Thus, even within a gear box which is charged with oil, a seal of this kind can be used to supply, for example, water under pressure to a passage in the shaft without serious danger of water leaking into the gear box. It will be seen that, as distinct from the embodiment of FIG. 1, the housing 16 is not a close sealing fit within a stationary surround member but is merely an enclosing housing for the seal itself, partially defining the central fluid-containing space within the seal, and partly protecting the essential components of the seal. This embodiment also illustrates an alternative method of locating the runner on the shaft, in that, instead of a locking ring, the runner is located between a shoulder 90 on the shaft and an annular abutment member 92 which is fitted to the shaft after the seal is installed.

Referring to FIG. 3; this seal is used in a rotary coal cutter for supplying water from a stationary shaft 10 to a rotary coal cutting head 14 which moves with a rotor 14' of the machine. In many respects the seal is in principle, though not in detail, similar to that of FIG. 1, and like parts are given the same reference numerals. In this embodiment, however, the shaft 10 is stationary and the members (14,14') rotate around it. Also, only one pair of sealing rings (24,31) is provided, defining an annular space 46 to one side of the seal, which space is enclosed by an end wall 15 of the housing 16. The housing 16 is fitted onto one end of the shaft 10, as shown, and it bolted to the rotor 14' of the machine. The runner 34 is secured against rotation relative to the shaft 10 by means of a pin 19 passing diametrically through the runner 34 locating in a slot 21 in the end of the shaft. The cutting head 14 is fitted to the housing 16 and is secured to a flange of the housing, thereby securing the cutting head 14 indirectly to the rotor 14'. The cutting head comprises eight compartments 57 leading to the cutter picks (not shown). Eight passages 56 in the head lead to the respective compartments from a registering series of eight passages 52 in the housing 16. A control sleeve 47 is fitted to the runner 34 and located by a radial pin 49. It has an aperture 53 which registers with each of the passages 56 in turn as the head rotates, so that water from the spaces 46 is supplied to each of the compartments in turn over a 45° arc of rotation. A passage 51 in the sleeve 47 connects the space 46 with the interior bore 60 of the shaft via an aperture 58 in the wall of the shaft, and a passage 48 connecting inner and outer annular recesses 50,55 in the runner 34.

A rotary bearing 68 is provided by an annular member 67 fixed to the housing 16 by engagement with a shoulder 69 and engagement of a circlip 71, and sealed thereto by an O-ring 83; and a pair of resilient annular sealing elements 85 carried by the runner 34 which seal against either side of the member 67. A pin 79 projecting from the runner lies within an annular rebate 77 in the member 67 to centre the member 67 between the element 85 and also to locate axially the runner and housing prior to and during fitting the seal unit to the machine. The bearing 68 prevents the entry of dirt into the interior of the seal unit, and also prevents the escape of any leaking water from the seal into the machine, any such leakage draining through a hole 65 in the housing 16.

I claim:

1. A rotary seal for establishing a seal between a shaft and a surrounding member with which the shaft is relatively rotatable, comprising:
    an annular outer component adapted to be rotatable relative to the shaft;
    an annular runner component adapted to be secured around the shaft;
    a first sealing member carried by the outer component;
    a second sealing member carried by the runner component;
    one of said first and second sealing members being axially located on said component which carries it, the other of said first and second sealing members being axially slidable on said component which carries it;
    spring means acting between said other sealing member and the component carrying said other sealing member to urge said other sealing member into sealing engagement with said one sealing member, thereby establishing an annular seal separating spaces on either side; and
    a setting ring engaging axially between said components and rotatable relative to at least one of them so as to locate axially the two said components relative to each other while allowing them to rotate relative to each other, the setting ring being of a material of substantially different hardness from the material of a said component with which it is in rotatable axial engagement, so that after the seal has been running for some time the softer material wears away to provide a clearance between the setting ring and at least one of said components.

2. A rotary seal according to claim 1 wherein two said setting rings are provided mutually opposed so as to establish axial location between the two components.

3. A rotary seal for establishing a seal between a shaft and a surrounding member with which the shaft is relatively rotatable, comprising:
    an annular outer component adapted to be rotatable relative to the shaft;
    an annular runner component adapted to be secured around the shaft;
    a first pair of axially spaced apart sealing members carried by the outer component;
    a second pair of axially spaced apart sealing members carried by the runner component;
    one pair of said first and second sealing member pairs being axially located on said component which carries them, the other pair of said first and second sealing member pairs being axially slidable on said component which carries them;
    spring means acting between said other pair of sealing members and the component carrying said other pair of sealing members to urge said other pair of sealing members into sealing engagement with said one pair of sealing members, thereby establishing two annular seals with a fluid-containing space between them; and
    a pair of setting rings engaging axially between said components and rotatable relative to at least one of them so as to locate the two said components relative to each other axially in either direction while allowing them to rotate relative to each other, the setting rings being of a material of substantially different hardness from the material of a said component with which they are in rotatable axial engagement, so that after the seal has been running for some time the softer material wears away to provide a clearance between the setting rings and at least one of said components.

4. A rotary seal according to claim 3 wherein the two setting rings are located at opposite axial end regions of the seal axially outwardly of the sealing members.

* * * * *